May 24, 1932.  C. H. WILL  1,859,418
AUTOMOBILE HEATER AND DEFLECTOR THEREFOR
Filed Dec. 11, 1929    2 Sheets-Sheet 1
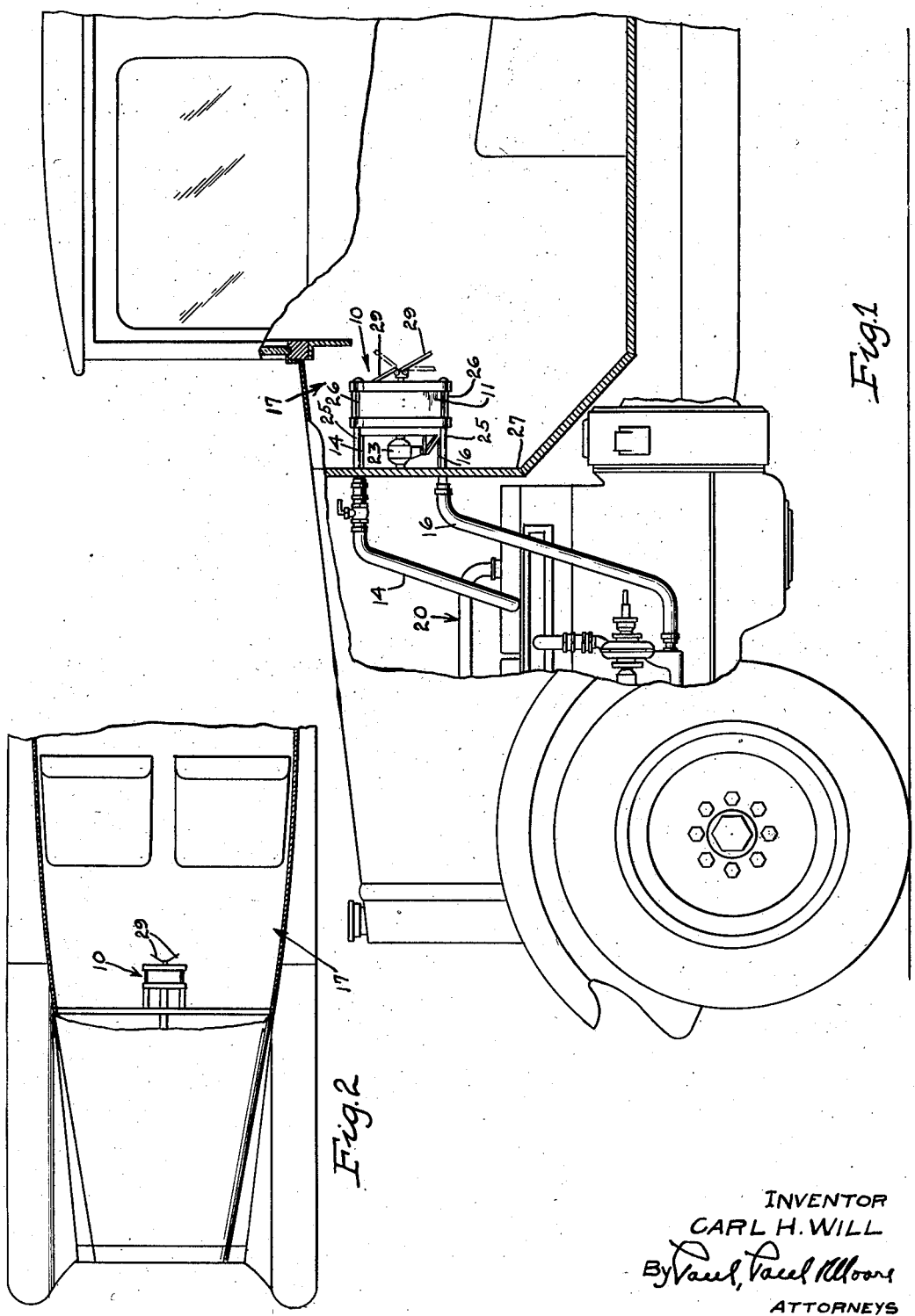
INVENTOR
CARL H. WILL
By Paul, Paul Moore
ATTORNEYS May 24, 1932. C. H. WILL 1,859,418
AUTOMOBILE HEATER AND DEFLECTOR THEREFOR
Filed Dec. 11, 1929 2 Sheets-Sheet 2
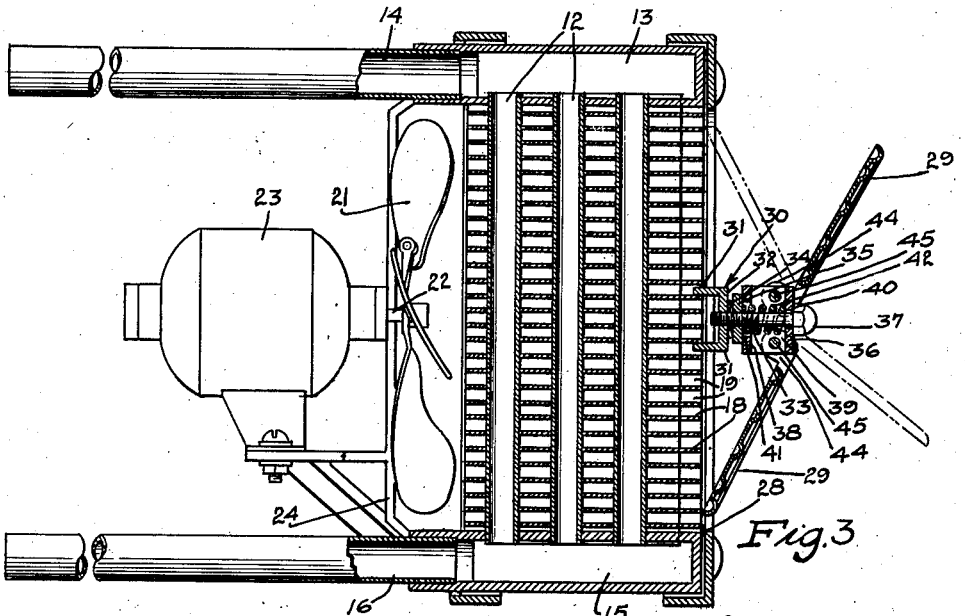
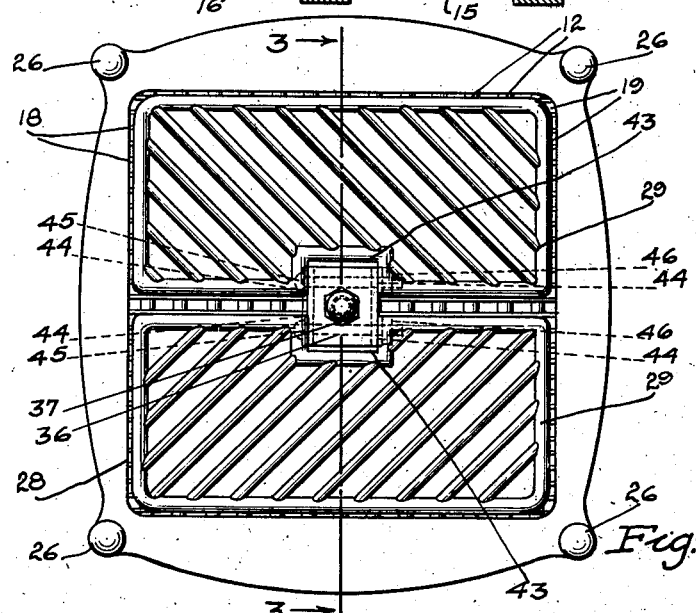
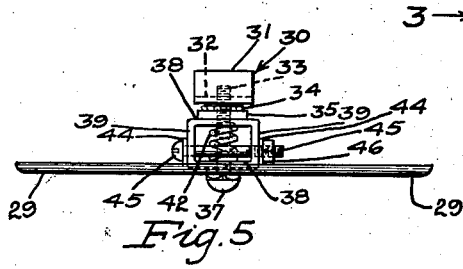
INVENTOR
CARL H. WILL
ATTORNEYS Patented May 24, 1932

1,859,418

UNITED STATES PATENT OFFICE

CARL H. WILL, OF MINNEAPOLIS, MINNESOTA, ASSIGNOR TO TROPIC-AIRE, INCORPORATED, OF MINNEAPOLIS, MINNESOTA, A CORPORATION OF DELAWARE

AUTOMOBILE HEATER AND DEFLECTOR THEREFOR

Application filed December 11, 1929. Serial No. 413,278.

An object of the invention is to provide an automotive vehicle heater situated interiorly of a vehicle body, having a heat deflector adjustably associated with said heater and capable of being positioned at will to direct warm air emanating from the heater toward any preferred part of the interior of the vehicle body, as, for example, toward or away from the driver or other occupant of the vehicle.

A further object is to provide an adjustable heat deflector which will also serve as a heat regulator adapted to control the passage of warm air from the heater to the vehicle body interior.

A still further object is to provide an automotive vehicle heater which will present certain improvements over the heater of my pending application Serial No. 331,265, filed January 9, 1929.

Other objects and advantages of the invention will become obvious as the full description thereof proceeds, it being understood that the disclosure herein is merely illustrative and that the invention is not limited to the exact structure set forth, various changes being permissible within the scope of the claims which follow:

In the accompanying drawings forming a part of this specification,

Fig. 1 is a view in side elevation of an apparatus having the features of the invention, disclosing a manner of associating the apparatus with an automotive vehicle and its water-circulating cooling system;

Fig. 2 is a top plan view of the apparatus of Fig. 1, on a smaller scale, a part of the automotive vehicle also being shown;

Fig. 3 is an enlarged central sectional view, taken as on line 3—3 in Fig. 4, of the heating element with heat regulator and deflector disclosed in Figs. 1 and 2;

Fig. 4 is a front elevational view of the heating element and regulator and deflector of Figs. 1, 2 and 3; and Fig. 5 is an edge elevational view of the regulator and deflector removed from the heating element.

With respect to the drawings, numeral 10 represents, generally, a heating element having the features of the invention and including a casing 11 housing water-circulating tubes 12 each opening at one end to a chamber 13 in which a fluid conducting member 14 is arranged, and each opening at its opposite end to a chamber 15 in which a fluid conducting member 16 is arranged. The manner in which the water-circulating tubes 12 are associated with the chambers 13 and 15 is very clearly disclosed in Fig. 3.

The heating element 10 will be mounted within an automotive vehicle body, such as represented at 17, desirably as disclosed in Figs. 1 and 2, although the heating element could be otherwise mounted in the vehicle body.

Numeral 18 represents spaced apart plates extending transversely of the water-circulating tubes 12 and having perforations through which said water-circulating tubes pass. Side portions of the casing 11 are adjacent to or contiguous with the ends of the spaced apart plates 18 to provide air-circulating passages 19 between the plates and about the tubes 12 and within the confines of the four walls of the casing 11.

The fluid conducting member 16 leads to the water-circulating cooling system 20 of the automotive vehicle, and the fluid conducting member 14 leads from said water-circulating system to the heating element, so that hot water can be caused to pass through the chamber 13, the water-circulating tubes 12, and the chamber 15, to cause air made to travel through the air-circulating passages 19 to be heated. The passage of water through the heating element as described could, of course, be reversed. When the heating element is mounted adjacent the dash of an automotive vehicle, as it is disclosed, the fluid conducting members 14 and 16 may pass through the dash.

The heating element as disclosed includes a fan 21 adjacent an end of the air-circulating passages 19 adapted to the purpose of causing air to be forcibly circulated through said air-circulating passages to absorb heat from the water in the water-circulating tubes 12, to thus be heated and to in turn heat the interior of the vehicle body. The fan 21 is supported upon the shaft 22 of a motor 23 itself supported upon a shroud 24 attached to or held against the heating element casing 11 in any suitable manner, as by sleeves 25 upon tie-bolts 26 which, as shown, support the heating element upon a board, such as a dash board, 27. The tie-bolts 26 pass through flanged frames upon the heating element casing, one of said flanged frames including the shroud 24, and the sleeves 25 are situated between the dash board 27 and the adjacent flanged frame to fixedly space this frame away from the dash board and to hold it against the heating element casing. The flanged frame opposite the dash board is held to the heating element casing by heads upon the tie-bolts 26.

The particular water-circulating system utilized is immaterial so far as the present invention is concerned, the one illustrated being satisfactory. The motor 23 with fan 21 may be supported upon the heating element in some other convenient manner. The fan forces air through the passages 19, heated by the hot water circulating through the chamber 13, the water-circulating tubes 12, and the chamber 15, and thus warms the air in the vehicle body and keeps the warm air in continuous circulation.

A specific purpose of the present invention is to provide a deflector for the heated air forced through the air-circulating passages 19, and which will serve as a heat regulating means controlling the passage of heated air through the heating element and into the vehicle body interior. The deflector and regulator is adjustable, is desirably removable, and is capable of being associated with any heating element having the general characteristics as illustrated and as hereinbefore briefly outlined.

Referring more particularly to Fig. 4. it will be seen that the open portion 28 of the casing 11 is there disclosed as practically square. Numeral 29 designates each of a pair of oblong deflector plates having length a trifle less than one dimension of the square open portion 28, and having width slightly less than one-half of said dimension of the square open portion. Each deflector plate could be of greater or less dimensions than stated.

Numeral 30 represents a stud plate suitably secured, as by welding or soldering, to the ends of certain of the plates 18, opposite the fan 21, desirably centrally of the open portion 28 of the front face of the casing 11. As shown, the stud plate 30 is of channel shape, the arms 31 thereof being positioned between certain of the plates 18 and secured thereto, and the body 32 of the stud plate being arranged adjacent the forward face of the heating element, parallel with said forward face.

A threaded opening in the body 32 of the stud plate 30 removably receives a screw bolt 33, and the screw bolt is locked in the stud plate by means of a lock washer 34 and a lock nut 35 upon the screw bolt and next adjacent to the stud plate. A box like frame 36, rotatably arranged upon the screw bolt 33 between the lock nut 35 and the head 37 of the screw bolt, includes spaced apart, parallel walls 38 through which the screw bolt extends, and spaced apart, parallel walls 39 integral with the walls 38. The outer wall 38 includes an opening 40 snugly but freely receiving the screw bolt, and the inner wall 38 includes a larger opening 41 through which the screw bolt passes. A coil spring 42 upon the screw bolt and within the box like frame 36 has one of its ends in yielding engagement with the outer wall 38 of the box like frame and its other end arranged in the opening 41 in yielding engagement with the lock nut 35 to place the box like frame under a bit of spring tension and cause it to remain, against the possibility of accidental displacement, at any axial position to which it is set upon the screw bolt 33.

Each deflector plate 29 is desirably rectangular and is constructed to be ornamental. As shown the deflector plates are corrugated. The inner portion of each is provided with a central cut-out 43 at the opposite ends of which are ears 44, preferably extending perpendicularly from the deflector plates and integral therewith, the said ears being spaced apart a distance a trifle greater than the distance between the walls 39 of the box like frame 36. When the deflector plates are associated with the box like frame, the ears 44 are desirably positioned in contiguous relation to the outer faces of the walls 39, the ears of the different deflector plates being arranged adjacent the opposite ends of said walls 39. Screw bolts 45 passing through the alining perforations in the walls 39 and the ears 44, each screw bolt carrying a nut 46, provide means for rotatably supporting the deflector plates upon the box like frame. The cut-out portions 43 are of sufficient depth to allow the deflector plates to be swung upon the screw bolts 45 as axes without interference between the box like frame and said deflector plates, and the arrangement is such that the screw bolts 45 with nuts 46 bring the ears 44 into sufficient frictional engagement with the outer faces of the walls 39 of the box like frame and with the heads of the screw bolts and the nuts to insure that the separately adjustable deflector plates will remain, against the possibility of accidental displacement, at any position to which adjusted about the screw bolts 45.

The manner in which the regulator and deflector plates function will be plain from the drawings. In Fig. 4 the deflector plates are shown in approximately parallel relation to the front face of the heating element to close nearly all of the open portion 28 of said front face to thus almost completely shut off the passage of hot air from the heating element to the vehicle body interior. In Fig. 3, in full lines, one of the deflector plates is shown swung against the lower portion of the front face of the heating element to stop the passage of heated air through said lower portion, and the other deflector plate is shown swung slightly away from the heating element to deflect air upwardly in the vehicle body. In dotted lines in Fig. 3 the positions of the deflector plates are approximately reversed. Both deflector plates can of course be drawn outwardly to be substantially perpendicular to the front face of the heating element to thus offer approximately no resistance to the passage of heated air to the vehicle body interior. The box like frame can be turned to any desired position upon its axis so that the deflector plates will be at any preferred oblique relations in a plane parallel with the front face of the heating element, and the obliquely disposed deflector plates can be adjusted on the screw bolts 45 toward or away from the heating element, to direct heat toward any preferred part of the interior of the vehicle body. The box like frame and each of the separately adjustable deflector plates will, as is obvious, remain in any adjusted position to which set.

It will be evident that the deflector unit can be very easily assembled with and disassembled from the heating element. By adjustment of the screw bolt 33 in the stud plate 30 and in the lock nut 35, the coil spring 42 can be put under any suitable tension to afford the requisite friction for stabilizing the position of the box like frame 36 at any of its adjusted locations about said screw bolt 33. The frictional contact between the ears 44 and the outer faces of the walls 39 of the box like frame requisite to stabilize the deflector plates when adjusted to a desired position is obtained by adjustment of the nuts 46 upon the screw bolts 45.

While I have described the opening 28 through the heating element as square in outline, and the deflector plates 29 as oblong, it will be evident that either said opening 28 or said plates 29, or both, may be of variant shape, within the principles of my invention.

The heating element 10 could be supported adjacent a wall of a vehicle body other than the dash. For example, said heating element could be situated between the front and rear seats of the vehicle body, instead of forwardly of the front seat as it is disclosed. In either case the heater could rest upon the floor of the vehicle body.

I claim as my invention:

1. In combination, a heating element having an open face, a stud supported upon said heating element adjacent said open face, a member rotatably mounted upon said stud, a heat deflector having a cut-out portion in one of its side edges, ears upon said heat deflector adjacent its cut-out portion, and means supporting said ears upon said member to allow said heat deflector to swing toward and from said open face, said heat deflector being adapted to remain, against the probability of accidental displacement, at any adjusted position to which set relatively to the heating element.

2. In combination, a heating element having an open face, a stud supported upon said heating element adjacent said open face, a member rotatably mounted upon said stud, oppositely disposed deflector plates each having a cut-out portion at an intermediate part of its inner edge, a plurality of ears upon each deflector plate adjacent its cut-out portion, and means engaging said member and said ears for supporting said deflector plates upon said member for swinging movement toward and from said open face, each of said deflector plates being adapted to remain, against the probability of accidental displacement, at any adjusted position to which set relatively to said heating element.

In witness whereof, I have hereunto set my hand this 7th day of December, 1929.

CARL H. WILL.